United States Patent [19]
Leonhartsberger et al.

[11] Patent Number: 5,454,709
[45] Date of Patent: Oct. 3, 1995

[54] INJECTION-MOULDING MACHINE

[75] Inventors: Heinrich Leonhartsberger; Werner Kappelmüller, both of Schwertberg; Stefan Eppich, Arbing, all of Austria

[73] Assignee: Engel Maschinenbau Gesellschaft M.b.H., Schwertberg, Austria

[21] Appl. No.: 271,173

[22] Filed: Jul. 7, 1994

[30] Foreign Application Priority Data

Jul. 12, 1993 [AT] Austria ................ 1369/93

[51] Int. Cl.⁶ .................................. B29C 45/64
[52] U.S. Cl. .................. 425/589; 425/451; 425/451.9; 425/453
[58] Field of Search ................ 45/589, 595, 451, 45/451.9, 453, 457; 100/258 R, 258 A

[56] References Cited

U.S. PATENT DOCUMENTS

| | | | |
|---|---|---|---|
| 5,129,817 | 7/1992 | Ing et al. | 425/589 |
| 5,145,353 | 9/1992 | Zakick | 425/451 |
| 5,192,557 | 3/1993 | Hirata et al. | 425/451.9 |
| 5,249,951 | 10/1993 | Leonhart et al. | 425/451.9 |
| 5,275,550 | 1/1994 | Romi | 425/451.9 |
| 5,314,327 | 5/1994 | Stein | 425/451.9 |

FOREIGN PATENT DOCUMENTS

| | | |
|---|---|---|
| 1278736 | 2/1965 | Germany . |
| 1931432 | 6/1969 | Germany . |

*Primary Examiner*—Khanh P. Nguyen
*Attorney, Agent, or Firm*—Notaro & Michalos

[57] ABSTRACT

An injection-moulding machine with a movable and a stationary mould-clamping plate (1, 2), wherein struts (4) are mounted in the stationary mould-clamping plate (1, 2), the struts connecting together the movable and stationary mould-clamping plates (1, 2) during the injection operation. The movable mould-clamping plate (2) is able to travel on rails (9) by way of a bracket-like running shoe (14), and, on opening the mould, is able to be released from the struts (4). Carriages (17) with rollers (18) are provided which are pivotally mounted to the movable mould-clamping plate (2) and which are tiltable about a horizontal axis (19) relative to the mould-clamping plate (2) and relative to the running shoes (14). Each running shoe (14) has a front roller (15) which can be raised from the rails (9) and lateral guide rollers (20) with vertical axes of rotation which roll down smooth guide surfaces (30) of the rails (9) and which are likewise raised from the rails (9) during the injection operation.

8 Claims, 8 Drawing Sheets

INJECTION-MOULDING MACHINE

The invention relates to an injection-moulding machine with a movable and a stationary mould-clamping plate, wherein struts are mounted in the stationary mould-clamping plate, which, during the injection process, connect the movable mould-clamping plate to the stationary mould-clamping plate, wherein the movable mould-clamping plate is able to travel on rails by means of a bracket-like running shoe, and, on opening the mould, is able to be removed from the struts.

A two-plate injection-moulding machine of this kind is described in EP-B1-0 296 410, for example.

In comparison with conventional machines with a third front plate, these kinds of two-plate machines have the advantage that they make a very great saving on material which results in a reduction in cost.

One problem which is occurring increasingly with these two-plate injection-moulding machines is that of the machine becoming deformed in the presence of the high closure force. Although such deformation occurs only to an extent of one tenth of a millimeter, it can result in damage to the guide for the movable mould-clamping plate.

EP-A1-0 310 807 discloses an injection-moulding machine, wherein the movable mould-clamping plate is able to travel on a separate slide. The mould-clamping plate is fixed to the slide by a centrally arranged vertical nut. The running shoes of the sliding carriage are held form-lockingly on the rails and are guided with precision on them. This design enables the corners of the mould-clamping plate to move laterally during the injection operation, without the guide means of the running shoe on the rails being subjected to stress. However, no account is taken of the fact that during the injection operation the movable mould-clamping plate is also deformed in the vertical extent.

The aim of the invention is to improve an injection-moulding machine of the afore-mentioned kind in such a way that the guidance of the movable mould-clamping plate during the injection operation remains largely unaffected by the closure force.

The problem according to the invention is solved in that carriages with rollers are provided which are pivotally mounted to the movable mould-clamping plate and which can be tilted relative to the mould-clamping plate and relative to the running shoes about a horizontal axis, and that the running shoes each have a front roller which can be raised from the rails and lateral guide rollers with vertical axes of rotation which roll down flat guide surfaces of the rails.

The construction according to the invention means that the movable mould-clamping plate only has compulsory guidance on the rails by way of its running shoe during the closing- and opening movements and in the open position. During the injection operation, guidance of the running shoe on the rails is suspended, and likewise deformation of the mould-clamping plate. The running shoe can move diagonally to the centre of the plate.

There will now follow a detailed description of an embodiment of the invention with the aid of the accompanying drawings, wherein:

FIG. 7 shows a section along line A–D of FIG. 2.

FIG. 8 shows a section along the line E–F of FIG. 2.

FIG. 9 shows the view II of FIG. 2.

Figure 1:
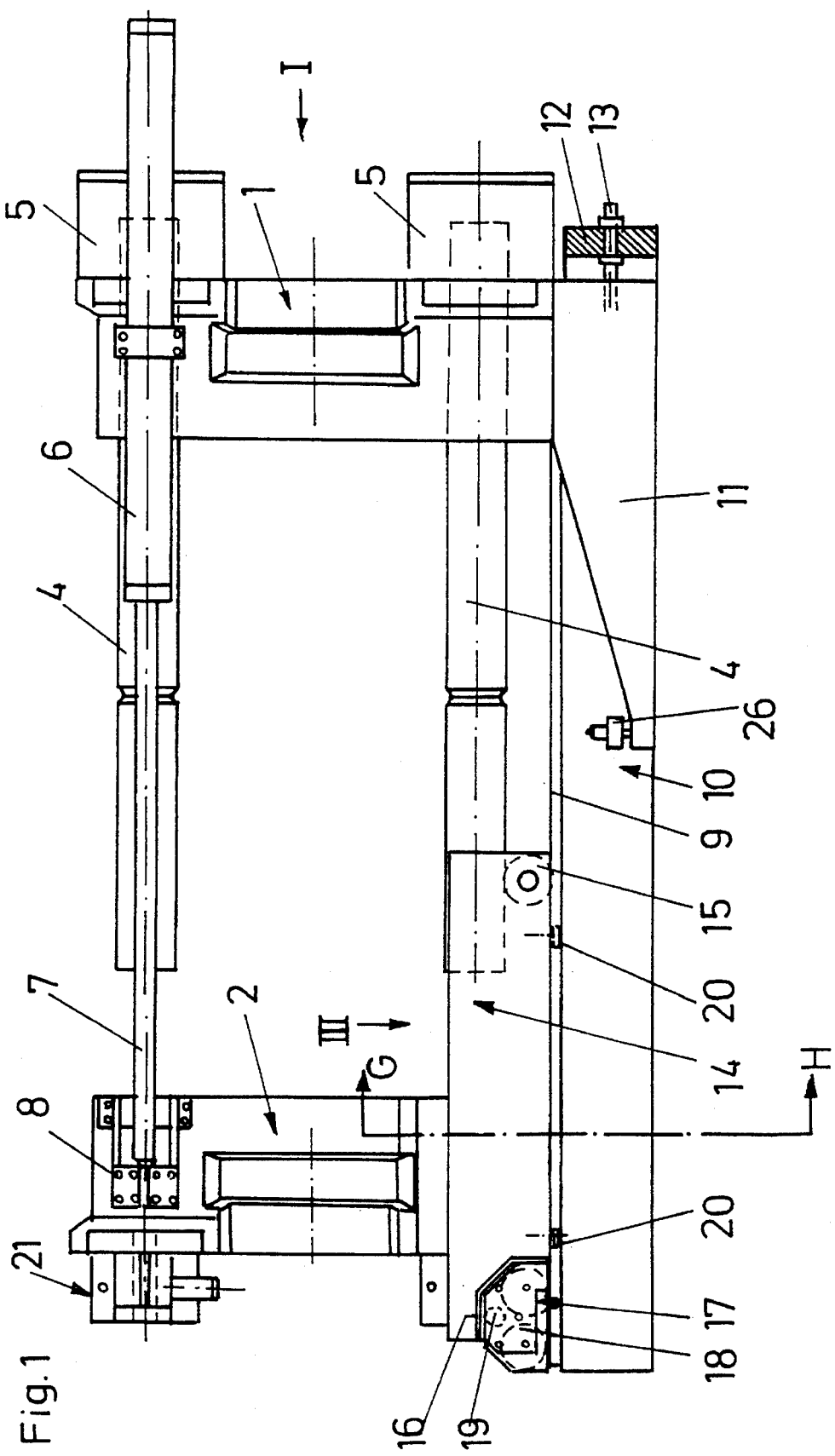
FIG. 1 shows a side view of the injection-moulding machine according to the invention with the mould open and with the mould-clamping plates pulled apart.

In the drawings, the stationary mould-clamping plate is denoted by the reference numeral 1 and the movable mould-clamping plate is denoted by the reference numeral 2. The two mould halves are denoted by the reference numeral 3.

Four struts 4 are mounted in the stationary mould-clamping plate 1. Pressure pads 5 are arranged on the mould-clamping plate 1 which can apply pressure to the struts 4 to produce the closure force.

Two quick motion cylinders 6 are mounted on the outside of the stationery mould-clamping plate 1, in which quick motion cylinders pistons 7 are able to travel which move the movable mould-clamping plate 2.

The pistons 7 are anchored to the movable mould-clamping plate 2 by means of clamping devices 8.

The movable mould-clamping plate 2 is able to travel on rails 9- The rails 9 are arranged on a U-shaped frame 10 which is designed as a separate part in relation to the mould-clamping plate 1 and its struts 11. The frame 10 is only hinged to the strut 11 of the mould-clamping plate 1 by one or more bolts 13. In this way, the frame 10 is able to move in relation to the mould-clamping plate 1 by the effects of the closure force, without the frame 10 being subjected to bending.

The movable mould-clamping plate 2 is equipped with bracket-like running shoes 14 which have rollers 15 mounted at their front ends. Directly at the mould-clamping plate 2 the running shoe 14 is provided with a recess 16. A carriage 17 with rollers 18 is mounted inside the recess 16 to pivot about an axis 19.

The running shoes 14 are on both sides also provided with lateral compensating rollers 20 with a vertical axis of rotation which roll down the sides of the rails 9. The lateral compensating rollers are offset with respect to each other, One roller 20 is situated next to the movable mould-clamping plate 2 the other near the free end of the running shoe 14.

The running shoes 14 are also provided with lateral compensating rollers 20 with a vertical axis of rotation which roll down the sides of the rails 9.

Figure 2:
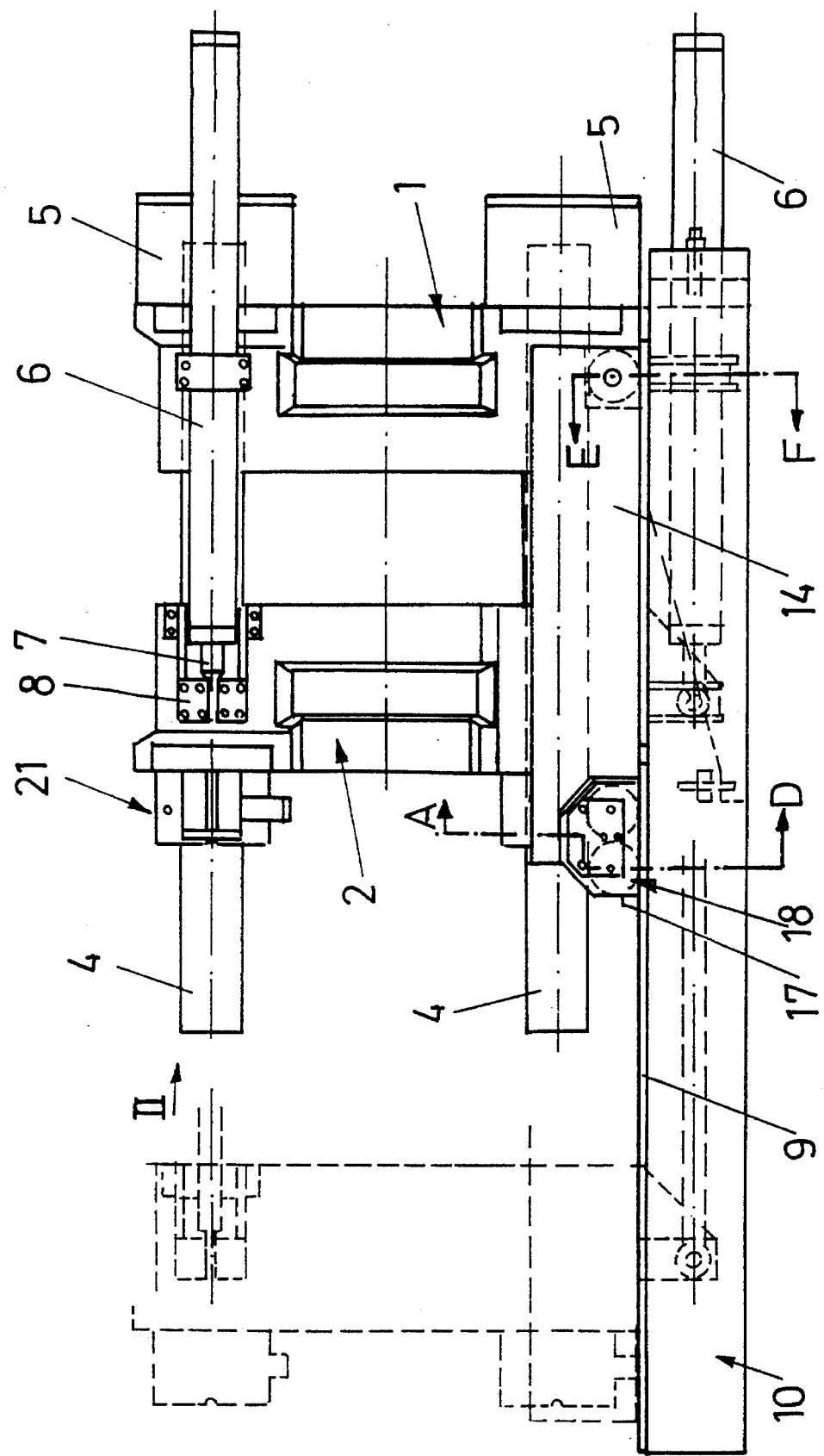
FIG. 2 shows the same side view with the mould closed.

The movable mould-clamping plate 2 is brought from the open position, shown in FIG. 1, by means of the piston cylinder 6, 7 of the quick motion device into the closed position shown in FIG. 2. The movable mould-clamping plate 2 is then locked to the struts 4. Each locking device 21 has two horizontally oriented and vertically displaceable half-shells 22 which are provided with projections 23 which engage into corresponding grooves on the struts 4. The projections 23 and the grooves on the struts 4 can preferably be screwthreaded.

A height abutment 24 for the bottom half shell 22 is arranged on the housing of each arresting device 21.

This brings the easily bent four struts 4 exactly into the horizontal plane during closure of the half shells 22, and raises them from the bottom half shell 22.

Figure 3:
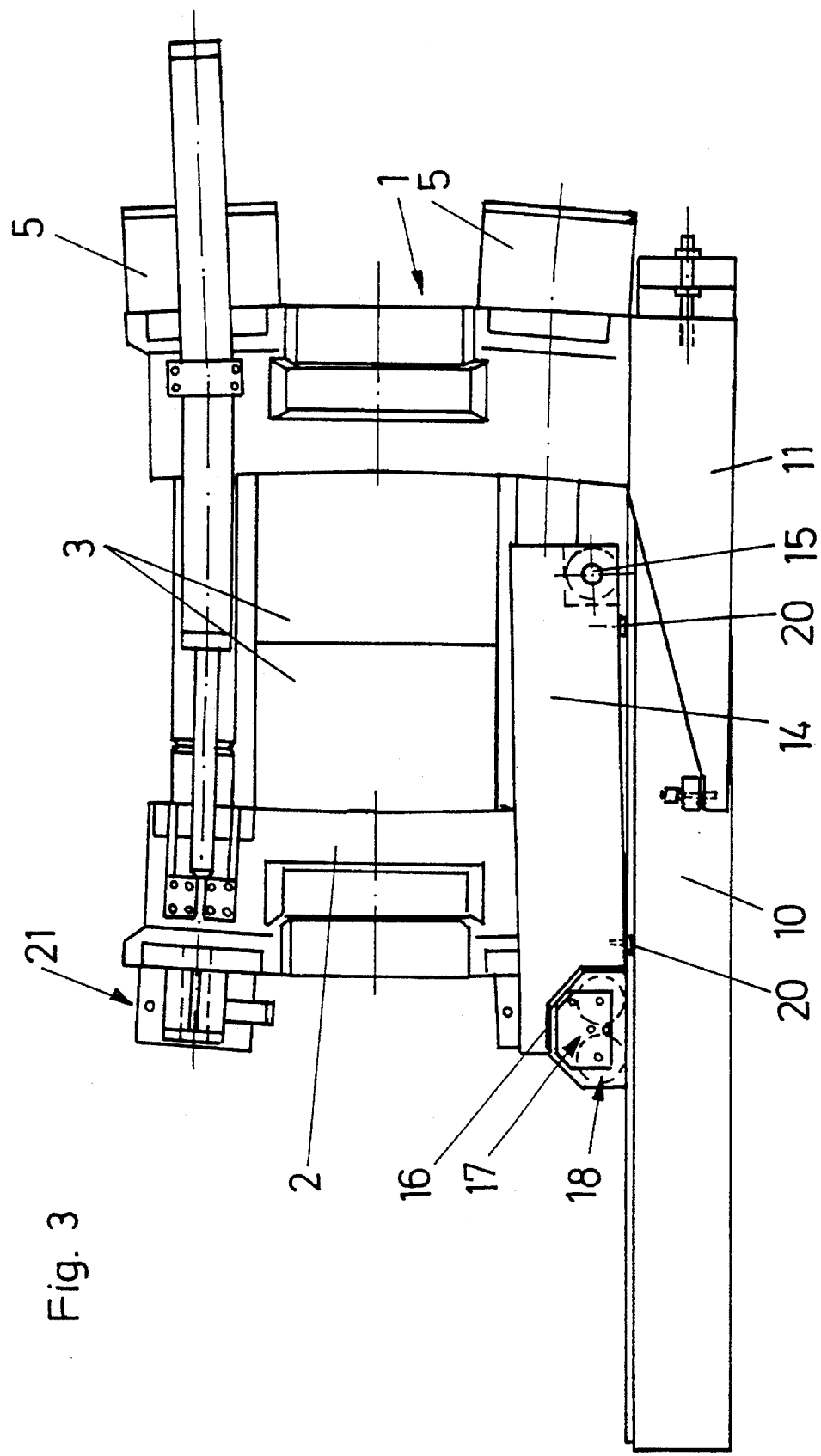
FIG. 3 shows the same side view, wherein deformation of the machine due to the effects of the closure force is shown schematically and in exaggerated manner.
Figure 4:
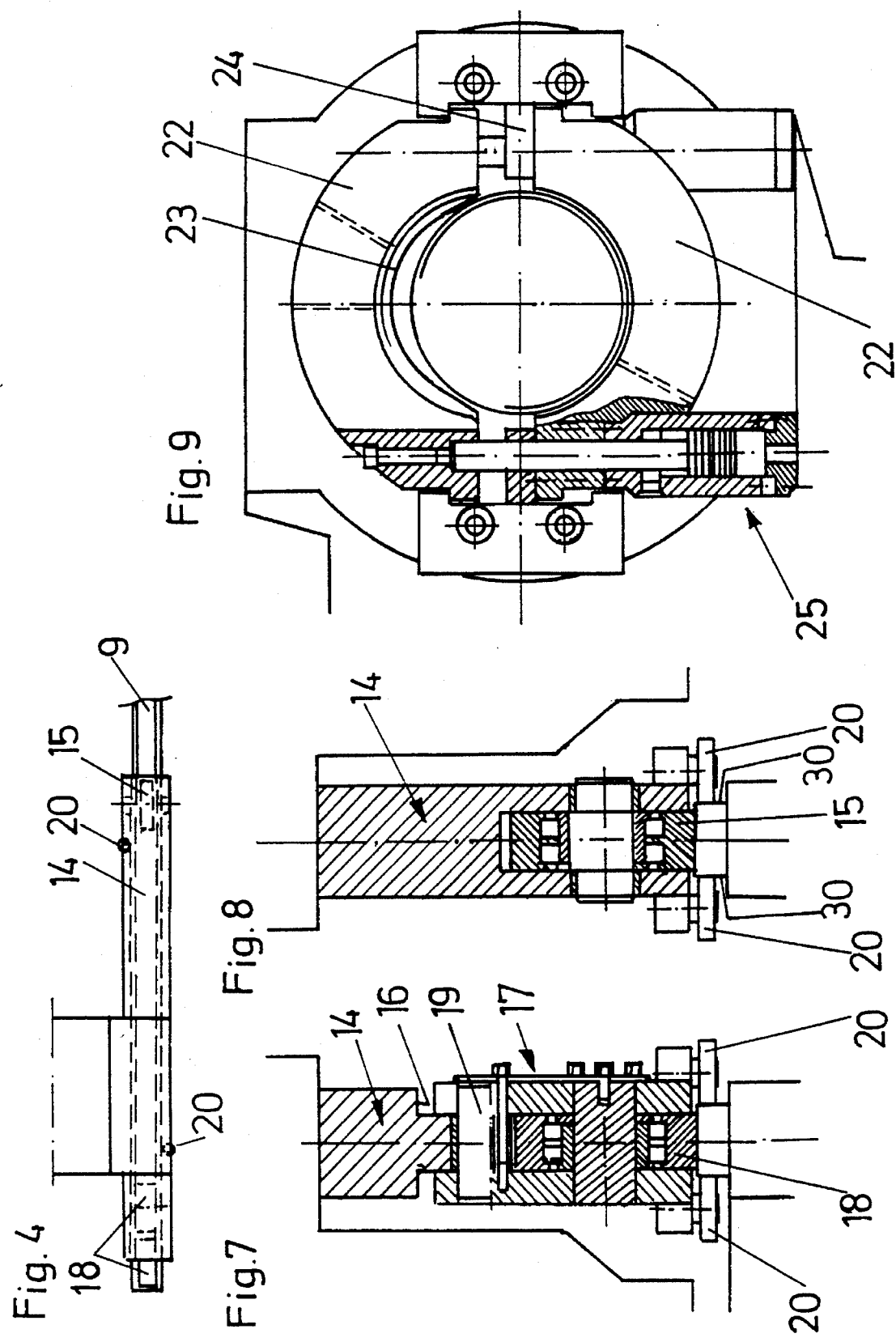
FIG. 4 shows the view III of FIG. 3 without closure force.
Figure 5:
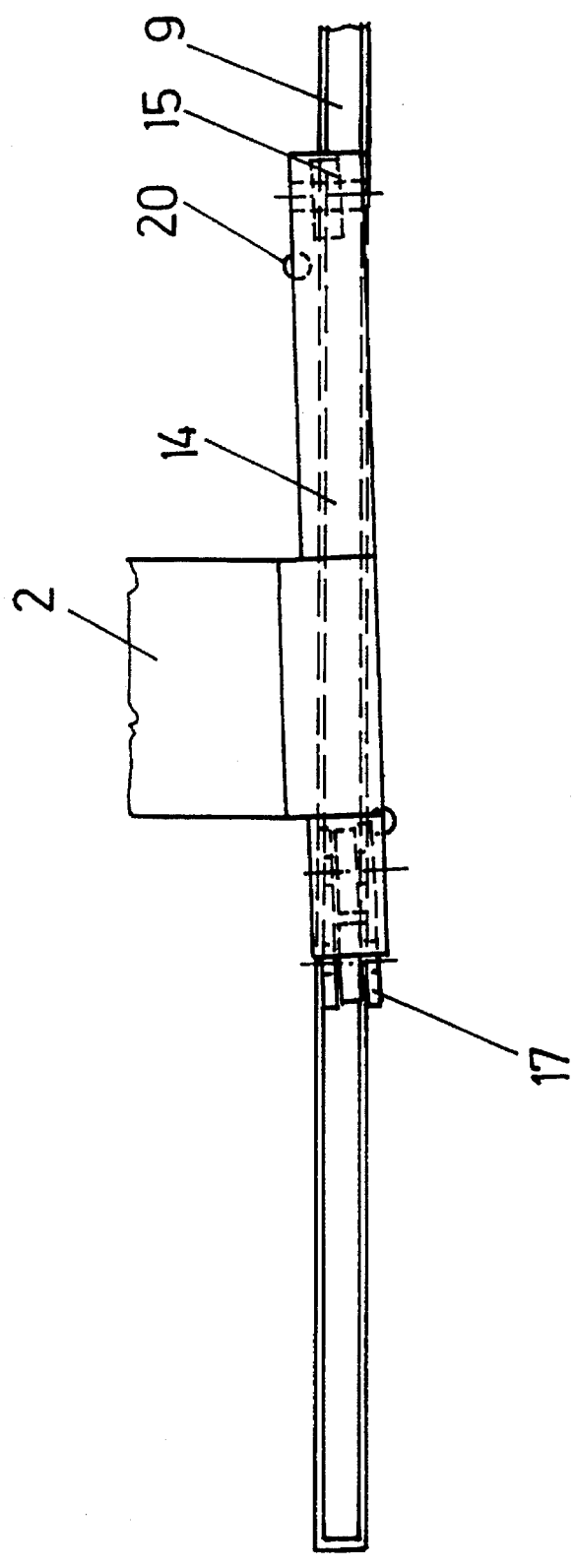
FIG. 5 shows the same view as FIG. 4, with the mould-clamping plates being subjected to closure force.
Figure 6:
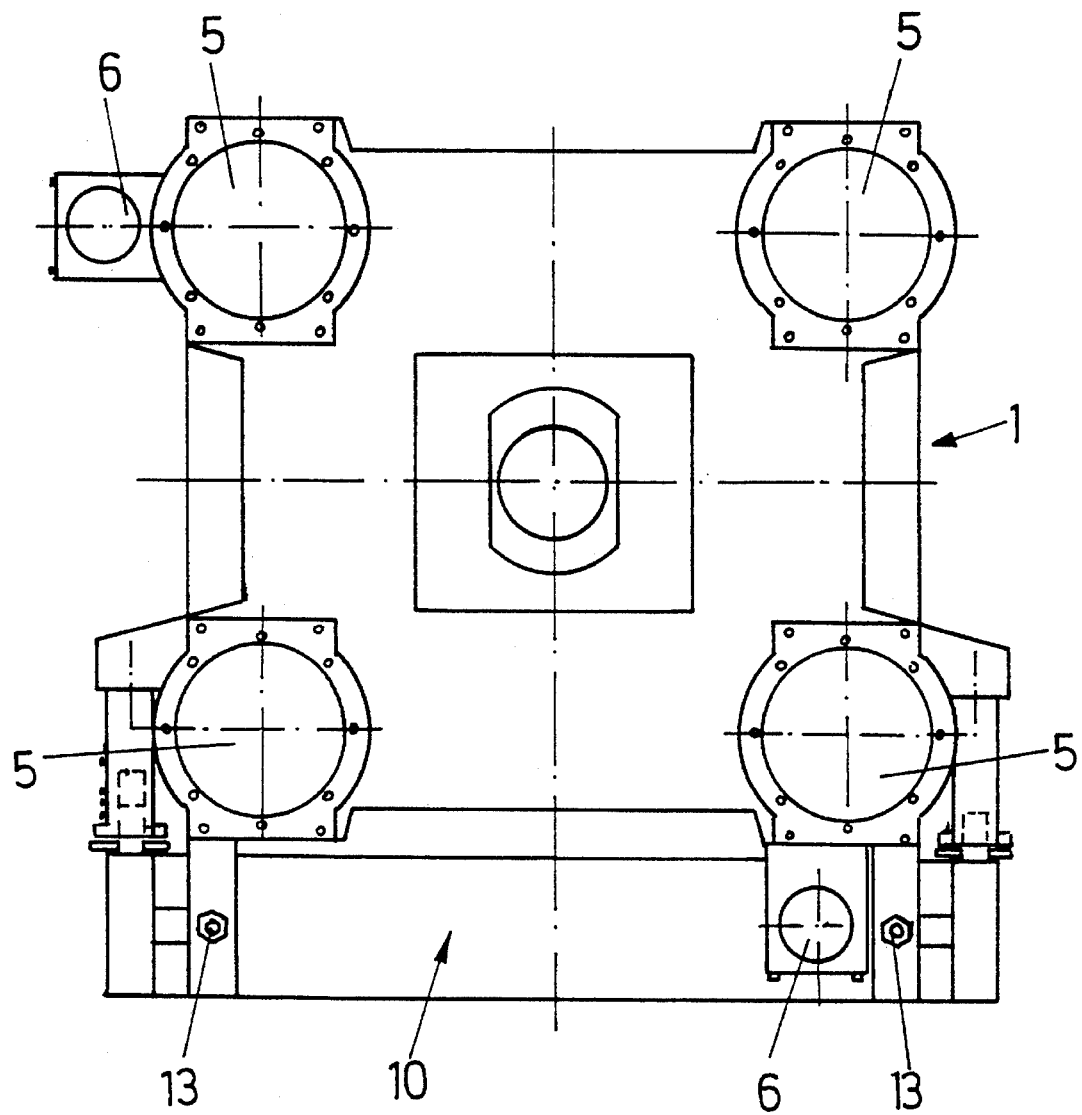
FIG. 6 shows the view I of FIG. 1.

Movement of the half shells 22 is effected by piston cylinder units 25. If closure force accumulates in the pressure pads 5 and if the movable mould-clamping plate 2 is pressed by means of the struts 4 onto the stationary mould-clamping plate 1, the injection-moulding machine is deformed in the manner shown in exaggerated manner in FIG. 3. The front roller 15 is raised but the rollers 18 which are mounted in the carriage 17 remain on the rails 9. In so doing, no bracing occurs between the mounting of the rollers 15 and the rollers 18.

Likewise, the stationary mould-clamping plate 1 with its support 11 moves relative to the frame 10. Here too, no bracing occurs between the frame 10 and the two mould-clamping plates 1, 2.

Figure 10:
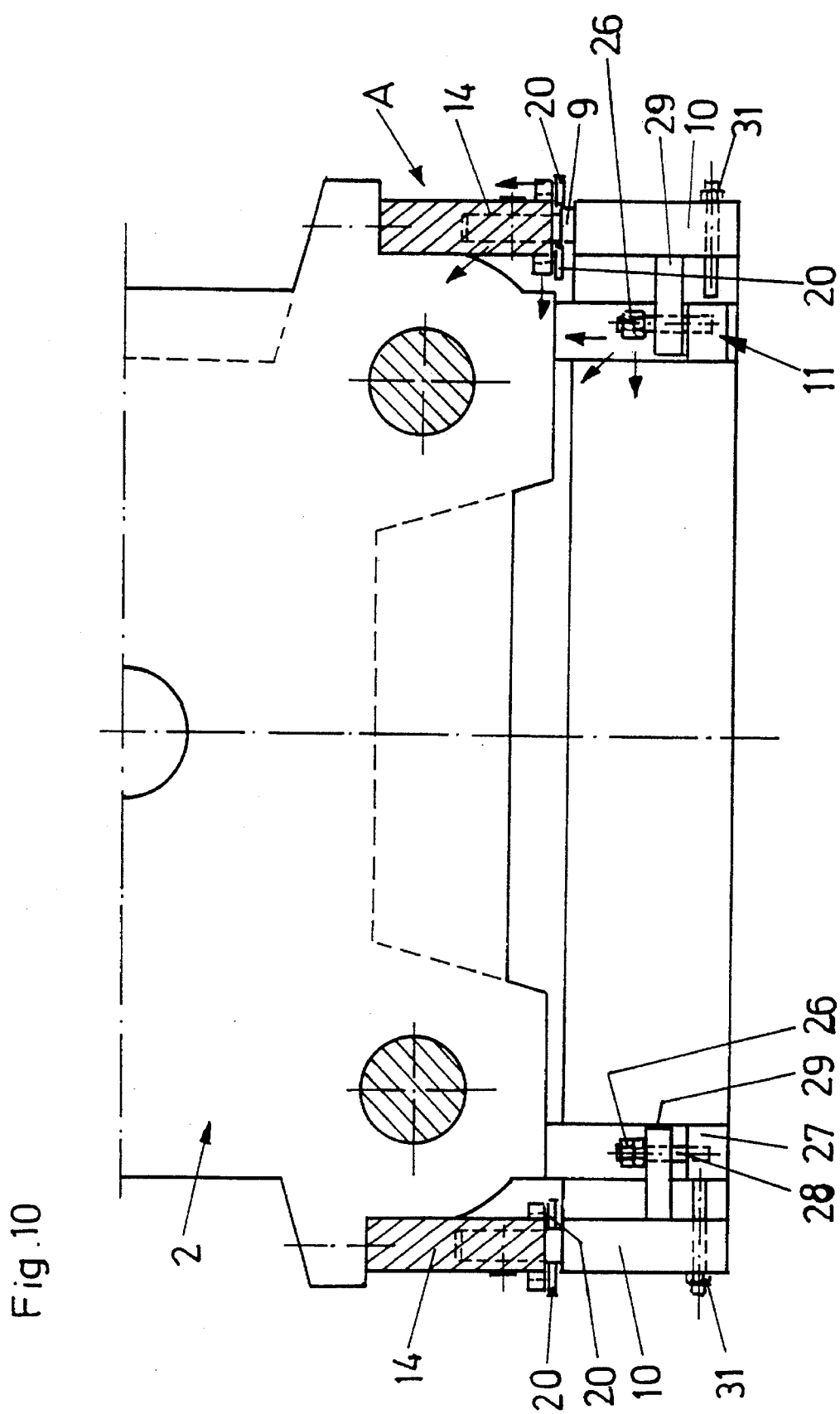
FIG. 10 shows a section along the line E-4 of FIG. 1, wherein the condition of the mould-clamping plate not subjected to closure force is shown to the left, and wherein the condition of the mould-clamping plate when subjected to closure force is shown to the right.
Figure 11:
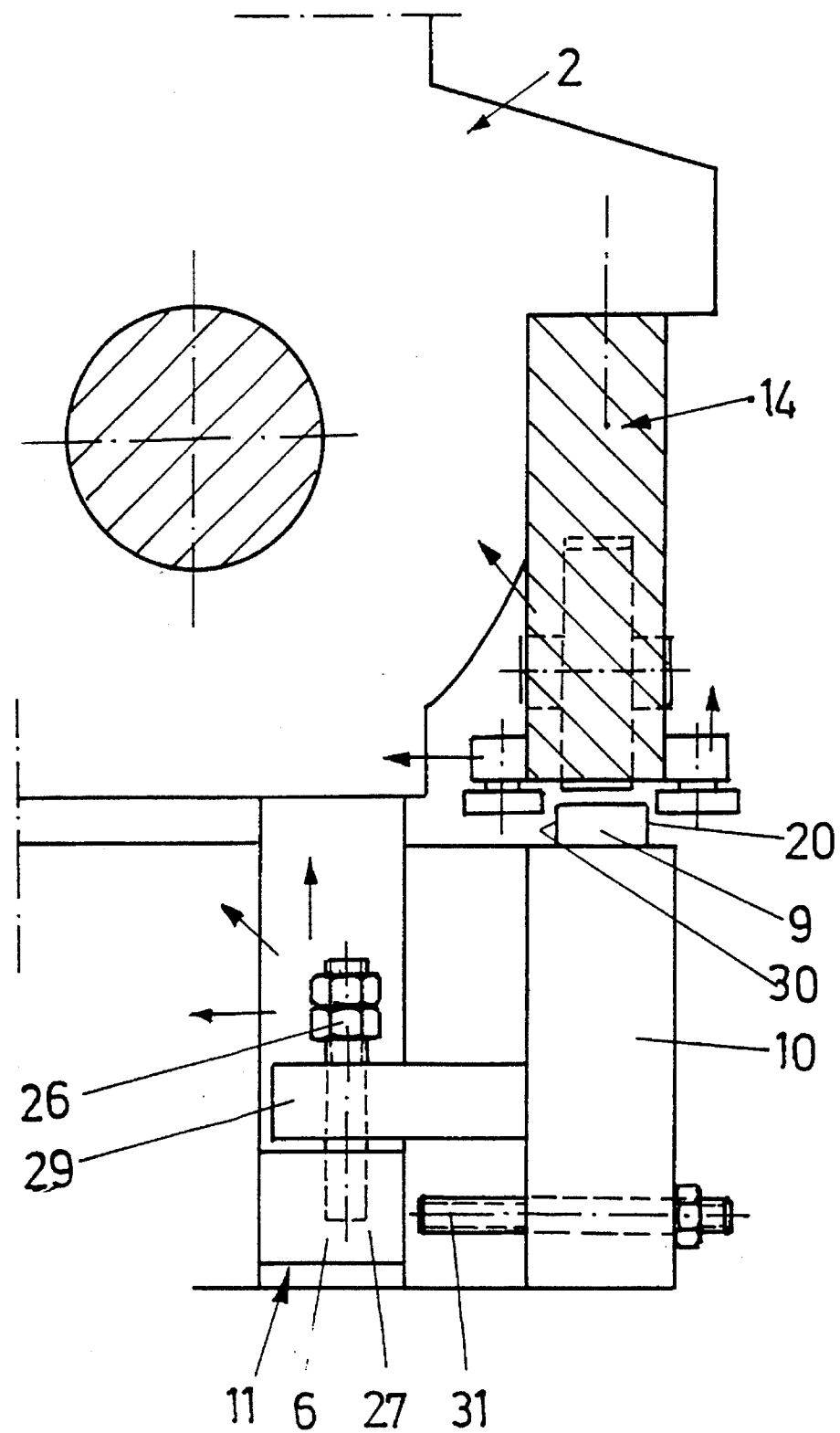
FIG. 11 shows the cut-out section A of FIG. 10 on a larger scale.

Threaded bolts 28 project into the front ends of the supports 27. The threaded bolts 28 project through brackets 29 which are fixed to the frame 10. On the threaded bolt 28 which projects through a slot in the bracket 29 there is an adjustment nut 26 which preferably has an associated locking nut. By twisting the adjustment nut 26 it is possible to straighten the foot 11, and thus the stationary mould clamping plate relative to the frame 10, and the foot 11 can be positioned with the mould-clamping plate 1. This is shown to the left in FIG. 10. When subjected to a closure force, the foot 11 is raised and moved inwardly with the threaded bolt 28. However, no tensioning is transmitted to the frame 10.

When the closure force ceases, the running shoe 14 is lowered again with the guide rollers 15 and the movable mould-clamping plate 2 is able to travel on the rails 9 by means of the piston cylinder devices 6, 7 after the arresting devices 21 have been opened.

The support 11 is likewise lowered, so that the exact alignment of the stationary mould-clamping plate 1 is reproduced. In order to ensure lateral alignment, abutment bolts 31 are provided in the frame 10.

We claim:

1. An injection-moulding machine with a movable and a stationary mould-clamping plate, wherein struts are mounted in the stationary mould-clamping plate, which, during the injection process, connect the movable mould-clamping plate to the stationary mould-clamping plate, wherein the movable mould-clamping plate is able to travel on rails by way of a bracket-like running shoe, and, on opening the mould, is able to be released from the struts, characterized in that carriages (17) with rollers (18) are provided which are pivotally mounted to the movable mould-clamping plate and which can be tilted relative to the mould-clamping plate (2) and relative to the running shoes (14) about a horizontal axis (19), and that the running shoes (14) each have a front roller (15) which can be raised from the rails (9) and lateral guide rollers (20) with vertical axes of rotation which roll down flat guide surfaces (30) of the rails (9).

2. An injection-moulding machine according to claim 1, characterized in that the roller (15) which is arranged at the end of the running shoe (14) facing the stationary mould-clamping plate (1) is mounted so that it is adjustable in height.

3. An injection-moulding machine according to claim 1 characterized in that two rollers (18) are mounted in each carriage (17).

4. An injection-moulding machine according to claim 1, characterized in that the carriages (17) are arranged in recesses (16) in the running shoe (14).

5. An injection-moulding machine according to claim 1, characterized in that two lateral guide rollers (20) are mounted on opposite sides of the running shoes (14) which are offset with respect to each other in the longitudinal direction of the running shoes.

6. An injection-moulding machine according to claim 1, characterized in that the rails (9) are arranged on a frame (10) which is separate from the stationary mould-clamping plate (1).

7. An injection-moulding machine according to claim 1 with a locking device in the movable mould-clamping plate which has two half shells which each embrace a strut in the closed position, wherein projections and recesses engage with each other in the half shells and the strut, characterised in that the half shells (22) are horizontally oriented and are displaceable vertically and that for the bottom half shell (22) an abutment (24) is provided in the vertical extent which defines the locking position of the half shell (22).

8. An injection-moulding machine according to claim 1, characterized in that the stationary mould-clamping plate (1) is mounted on supports (11) which bear threaded bolts (28) with adjustment nuts (26) which project through slots in cover plates (29) fixed to the frame (10).

* * * * *